United States Patent

Muller

[15] 3,659,860
[45] May 2, 1972

[54] BARRIER SEAL WITH SELF REGULATING BUFFER

[72] Inventor: Heinz K. Muller, Neustadt, Germany
[73] Assignee: Sealol, Inc., Warwick, R.I.
[22] Filed: June 8, 1970
[21] Appl. No.: 43,998

Related U.S. Application Data

[62] Division of Ser. No. 728,950, May 14, 1968, Pat. No. 3,556,538.

[30] Foreign Application Priority Data

June 3, 1969 Germany..............................M 74257

[52] U.S. Cl.................................................277/59, 277/74
[51] Int. Cl.......................................................F16j 15/40
[58] Field of Search.............................277/3, 27, 28, 74, 91

[56] References Cited

UNITED STATES PATENTS

| 3,556,538 | 1/1971 | Muller | 277/27 |
| 2,916,332 | 12/1959 | Pavlecka | 277/74 X |
| 3,141,677 | 7/1964 | Williams | 277/3 |
| 2,930,636 | 3/1960 | Tracy | 277/27 |
| 3,026,112 | 3/1962 | Mayer | 277/3 |
| 3,447,809 | 6/1969 | Marrojo et al. | 277/27 |

FOREIGN PATENTS OR APPLICATIONS 891,419 3/1962 Great Britain..........................277/27

*Primary Examiner*—Samuel B. Rothberg
*Attorney*—William Frederick Werner

[57] ABSTRACT

This specification discloses a barrier seal in which the pressure of the fluid is being sealed is opposed by the flow rate of a buffer fluid with a movable ring interposed between the two. This ring is movable axially under the influence of the differential which obtains between the pressures of the sealing fluid and buffer fluid. Appropriate passages are provided for the buffer fluid and seals are provided between the movable ring and the shaft and housing in which the barrier seal is installed.

9 Claims, 4 Drawing Figures

INVENTOR
HEINZ K. MÜLLER

*William Frederich Werner*
ATTORNEY

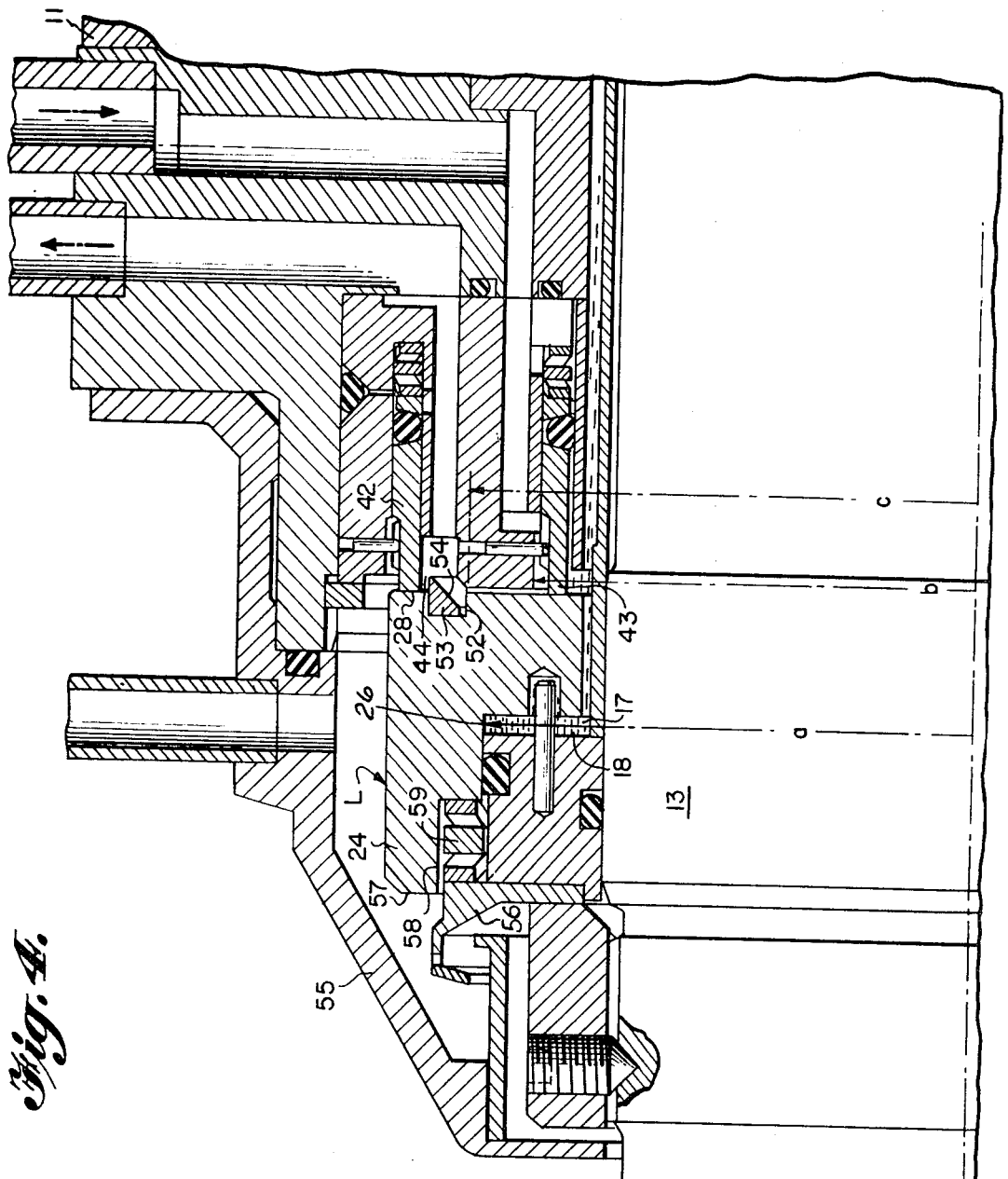

BARRIER SEAL WITH SELF REGULATING BUFFER

This application is a division of application Ser. No. 728,950, filed May 14, 1968, now U.S. Pat. No. 3,556,538, granted Jan. 19, 1971, by Heinz K. Miller for a Barrier Seal with Self Regulating Buffer.

The present invention relates to the barrier seals commonly employed in conjunction with a rotary shaft to provide for the sealing of a fluid under high pressure and is concerned primarily with a seal of this type in which the rate of flow of a buffer fluid opposes or counteracts the pressure of the fluid being sealed.

Attempt has been made to provide a barrier seal which functions on this general principle but such known devices may be characterized by the division of the space containing the buffer fluid into two chambers by a throttling element. This relieves the contact seal on the low pressure side from a high differential but requires external control equipment for the throttling element. Such supplementary equipment is undesirable both from the aspect of cost and the possibility of becoming out of order.

With these conditions in mind the invention has, as an object, the provision of a barrier seal for a rotary shaft mounted in a housing with a high pressure sealing fluid between the two, the barrier seal including an axially movable ring which cooperates with the housing to define a chamber for a buffer fluid. This buffer fluid is supplied to the chamber under a constant flow rate and the latter pressure opposes or counteracts the pressure of the sealing fluid so that the position of the ring is determined by the differential obtaining between the two pressures.

Another object is to provide, in a barrier seal of the type aforesaid, a movable ring of L-shaped cross section. One arm of the L in the form of a sleeve presents an inner cylindrical surface which engages the shaft, or an annulus carried thereby, and an outer cylindrical surface which together with an outer radial face on the other arm of the L, in the form of an end flange, are engaged by the buffer fluid.

Another object is to provide, in a barrier seal of the character noted, a contact seal for the inner cylindrical surface of the ring and a second contact seal for the face of the end flange which presents the radial face. These contact seals contain the high pressure fluid.

It is important to provide for the introduction of the buffer fluid to the chamber where it is effective. Thus another object is to provide, in a barrier seal of the type noted, a housing having an inlet passage for the buffer fluid and an outlet passage for relieving buffer fluid from the chamber.

In some instances it may be desirable to provide what is in effect a closed buffer fluid chamber on one side of the radial face aforesaid. In such a case a contact seal is provided between the housing and outer cylindrical surface that extends over the end flange.

In lieu of the contact seals for the face and outer cylindrical surface adjacent to the radial face it may be desirable to provide contact seals which engage the radial face at different radial distances. Thus another object is to provide, in a barrier seal of the kind aforesaid, a pair of coaxial contact seals that are carried by the housing and engage the radial face under spring pressure.

In the latter form of the invention the inlet for buffer fluid is adjacent to the innermost of the sealing rings. If the fluid is under a high rate of flow, it will impinge against the outermost contact sealing ring with an undesirably high rate of flow. To prevent this the movable ring is provided with a baffle which projects into the buffer fluid chamber within the outermost sealing ring.

There may be occasions when it will be desirable to provide mechanical means which affect or control the differential between the pressure of the sealing and buffer fluids. Thus another object is to provide, in a barrier seal of the type noted, spring means for urging the movable ring axially in a direction enlarging the space which receives the sealing fluid.

Various other more detailed objects and advantages of the invention such as arise in connection with carrying out the above noted ideas in a practical embodiment will, in part become apparent, and in part be hereinafter stated as the description of the invention proceeds.

For a full and more complete understanding of the invention reference may be had to the following description and accompanying drawings wherein:

FIG. 4 is a more complete section of another embodiment.

Figure 1:
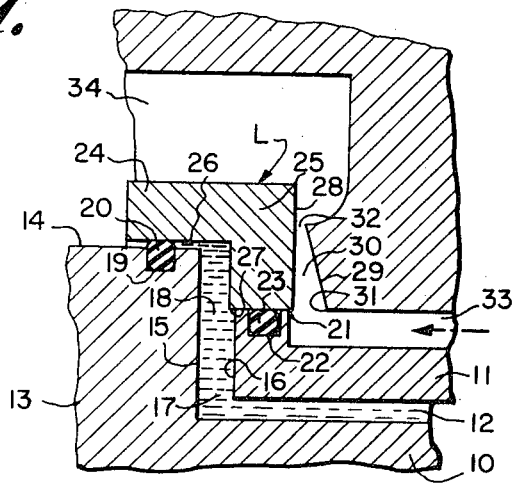
FIG. 1 is a fragmentary section through a portion of a shaft and housing with the barrier seal of this invention included therein.

Referring now to the drawings, and first more particularly to FIG. 1, a shaft 10 is shown as journalled in a housing 11 with the space between the two shown as exaggerated at 12. The shaft 10 has an enlarged portion 13 presenting a cylindrical surface 14 and a radial end face 15. The latter is spaced from a flat end face 16 on the housing 11 to provide a space 17 that communicates with the space 12.

The sealing fluid which ordinarily is under high pressure occupies the spaces 12 and 17. This pressure fluid is indicated at 18.

The cylindrical surface 14 is formed with an annular groove 19 closely adjacent to the end face 15. Received in the groove 19 is a contact seal 20 which may take the form of the O ring illustrated and is of elastic material. The housing 11 is formed with a cylindrical surface 21 that extends inwardly from the end face 16. Formed in the surface 21 is an annular groove 22 which receives a contact seal 23 which also may be an O ring.

A movable ring is identified in its entirety by the reference character L. It is of L cross section and comprises a sleeve 24 and an end flange 25. The sleeve 24 presents an inner cylindrical surface 26 engaged by the contact seal 20. The flange 25 has a face 27 engaged by the contact seal 23.

The ring L is axially movable along the surface 21 of housing 11 and surface 14 of shaft enlargement 13.

The flange 25 of ring L has a radial face 28 and opposite to the latter the housing 11 is formed with a face 29 that is inclined relative to the face 28 and cooperates therewith to define a conical chamber 30 having a large inlet end at 31 and a narrow outlet at 32.

An inlet passage for buffer fluid is shown at 33 as formed in the housing 11 and connecting with the larger end 31 of chamber 30. The housing 11 also provides a space 34 about shaft enlargement 13 and ring L. The chamber 30 communicates with this space 34 by way of the restricted outlet 32.

It will be understood that pressure of fluid 18 will tend to urge the ring L to the right (speaking with reference to the showing of FIG. 1), that is away from the shaft enlargement 13. At the same time buffer fluid is introduced under constant rate of flow through passage 33 to chamber 30. It is effective against the face 28 of ring L to tend to move the ring L to the left, thus opposing the pressure of the fluid 18. Thus the ring L is moved by the differential which obtains between the two pressures until it assumes a position in which it is balanced. Any change in the pressure of either fluid is accommodated by a shifting of the ring L.

Figure 2:
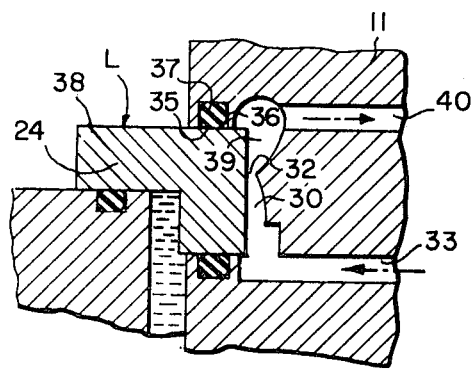
FIG. 2 is a view similar to FIG. 1 of a slightly modified form.

Referring now more particularly to FIG. 2, the modified embodiment therein illustrated will be described. Parts corresponding to the same parts depicted in FIG. 1 bear the same reference characters.

It will be noted that the housing 11 is formed with an annular surface 35 which is, in turn, formed with an annular groove 36. A contact seal 37 is received in the groove 36 and engages an outer cylindrical surface 38 on the ring L.

The housing 11 is formed with a recess 39 which communicates with the chamber 30 by way of the restricted outlet 32. An outlet passage 40 connects with this recess 39. Obviously buffer fluid under pressure is supplied to chamber 30 and recess 39 by the inlet passage 33. It is exhausted by the outlet passage 40.

Figure 3:
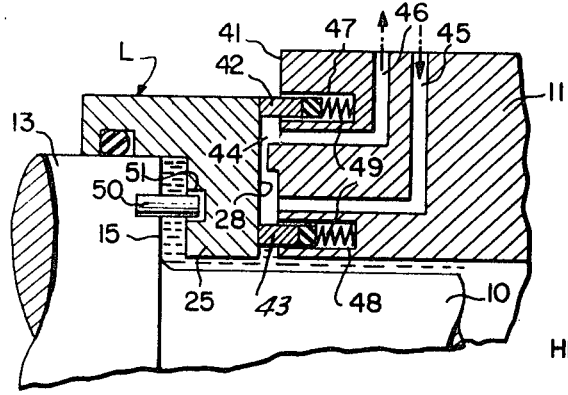
FIG. 3 is another fragmentary section of still another modification.

FIG. 3 illustrates a modification in which contact seals carried by the housing engage the radial face 28 of the ring L. The housing 11 has a face 41 that is spaced from and substantially parallel to the face 28. These faces 28 and 41 cooperate with contact seals 42 and 43 to define a buffer fluid pressure chamber 44. An inlet passage 45 communicates with the chamber 44 as does an outlet passage 46.

Entering into the housing 11 from the face 41 are two annular grooves 47 and 48. The sealing ring 42 is received in the groove 47 and the sealing ring 43 in the groove 48. Expansion coil springs 49 are interposed between the bottom of each of the grooves 47 and 48 and the ring 42; 43 that is received therein. These springs 49 urge the seals 42 and 43 into engagement with the surface 28.

With this arrangement it is necessary that the ring L be properly positioned relative to the shaft 10. Thus pins 50 are shown as carried by the shaft enlargement 13 and projecting from the face 15. The flange 25 of the ring L is formed with a series of recesses 51 which loosely receive the pins 50 to corelate the ring L to shaft 10.

FIG. 4 discloses two additional features that are included in a further modification. The face 28 of the ring L is formed with an annular recess 52 which receives a ring 53 having an inwardly opening conical face 54. The ring 53 projects into the chamber 44 whereby the conical face 54 acts as a baffle to reduce the impinging force of the buffer fluid stream prior to engagement with the sealing ring 42.

The housing 11 is shown as carrying an end casting 55. The latter extends over and beyond the ring L and carried therewith is a retaining ring 56. The end face 57 of the ring L remote from the face 28 is formed with a counterbore 58. An expansion spring 59 is received in this counterbore and bears against the bottom of the latter and the retaining ring 56. This spring 59 tends to move the ring L to the right (speaking with reference to the showing of FIG. 4) and thus enlarge the space 17 which receives the pressure fluid 18. This inhibits the creation of too great a differential between the pressure of the buffer fluid and sealing fluid.

The cylindrical surface 26 of the sleeve 24 which constitutes the outer wall of the space 17 has a radius $a$ which is slightly greater than the radius of the shaft enlargement 13. The chamber 44 of FIGS. 3 and 4 has an inner cylindrical surface defined by radius $b$ which is appreciably less than radius $a$ and an outer cylindrical wall determined by a radius $c$ which is greater than the radius $a$.

The buffer fluid is preferably cooled and acts as a cooling medium for either of the contact seals 23 or 43.

While preferred specific embodiments of the invention are hereinbefore set forth it is to be clearly understood that the invention is not to be limited to the exact constructions, mechanisms, and devices illustrated and described because various modifications of these details may be provided in putting the invention into practice within the purview of the appended claims.

What is claimed is:

1. In a barrier seal, a housing having an end surface, a shaft journalled in said housing and having an enlarged end portion presenting a radial face spaced from said housing end surface, a ring of L cross section comprising a sleeve receiving said shaft enlargement and an end flange disposed between said radial face and housing end surface, one face of said flange being spaced from said radial face to define a pressure fluid space, the other face of said flange being spaced from said housing end surface to provide a buffer fluid chamber, a contact seal between the inner surface of said sleeve and said shaft enlargement, a contact seal between the outer surface of said end flange and said housing, an inlet passage for buffer fluid under a constant flow rate communicating with said chamber, and an outlet passage for buffer fluid communicating with said chamber, said ring being axially movable under the influence of the differential in pressure between said pressure and buffer fluids.

2. The barrier seal of claim 1 in which the contact seals are of elastic material.

3. The barrier seal of claim 1 in which said chamber has a restricted neck between said inlet and outlet passages.

4. In a barrier seal, a housing having an end surface, a shaft journalled in said housing and having an enlarged end portion presenting a radial face spaced from said housing and surface, a ring of L cross section comprising a sleeve receiving said shaft enlargement and an end flange disposed between said radial face and housing end surface, one face of said flange being spaced from said radial face to define a pressure fluid space, pressure fluid in said pressure fluid space, the other face of said flange being spaced from said housing end surface to provide a buffer fluid chamber, buffer fluid in said buffer fluid chamber, a contact seal between the inner surface of said sleeve and said shaft enlargement, a pair of radially spaced sealing rings carried by said housing and projecting from the end surface thereof into engagement with said end flange, said sealing rings constituting the inner and outer limits of said chamber, an inlet passage for buffer fluid communicating with said shamber, and an outlet passage communicating with said chamber, said L ring being axially movable under the influence of the differential in pressures of said sealing and buffer fluids.

5. The barrier seal of claim 4 in which said sealing rings are spring biased into engagement with said end flange.

6. The barrier seal of claim 4 together with means for loosely maintaining the L ring in assembled relation on said shaft enlargement.

7. The barrier seal of claim 4 together with a baffle carried by said L ring and projecting into said chamber to reduce the rate of flow of buffer fluid entering said chamber.

8. The barrier seal of claim 4 together with mechanical means for causing axial movement of said L ring.

9. The barrier seal of claim 4 together with a spring for biasing said L ring toward said housing.

* * * * *